United States Patent [19]
Foote et al.

[11] 4,321,854
[45] Mar. 30, 1982

[54] COMPOSITE LINE OF CORE AND JACKET

[75] Inventors: Danny R. Foote; Susan F. Turner, both of Spirit Lake, Iowa

[73] Assignee: Berkley & Company, Inc., Spirit Lake, Iowa

[21] Appl. No.: 44,386

[22] Filed: Jun. 1, 1979

[51] Int. Cl.³ .................. D04C 1/12; A01K 91/00
[52] U.S. Cl. ............................. 87/6; 43/44.98; 57/210; 87/8
[58] Field of Search ........................... 87/5–9, 87/1; 57/207, 210, 212, 216, 220, 225, 244, 245; 116/200, 212; 43/44.98, 17

[56] References Cited

U.S. PATENT DOCUMENTS

| | | | |
|---|---|---|---|
| 1,982,304 | 11/1934 | Holden | 43/44.98 X |
| 2,257,953 | 10/1941 | Haskell | 87/6 |
| 2,284,728 | 6/1942 | Dreyfus | 87/6 X |
| 2,327,104 | 8/1943 | Gudebrod | 87/6 X |
| 2,443,711 | 6/1948 | Sisson | 428/373 X |
| 2,517,946 | 8/1950 | Kohorn | 19/1 |
| 2,536,312 | 1/1951 | Saether | 43/44.98 X |
| 2,610,539 | 9/1952 | Hedge | 43/44.98 X |
| 2,737,075 | 3/1956 | Poirier et al. | 87/6 |
| 2,748,525 | 6/1956 | Volz | 43/44.98 |
| 2,861,319 | 11/1958 | Breen | 57/210 X |
| 2,987,797 | 6/1961 | Breen | 428/373 |
| 3,030,851 | 4/1962 | Meyer | 87/6 |
| 3,035,476 | 5/1962 | Fogden | 87/6 X |
| 3,036,490 | 5/1962 | Muller et al. | 87/6 |
| 3,073,209 | 1/1963 | Benk | 87/6 |
| 3,078,755 | 2/1963 | Chace, Jr. | 87/6 X |
| 3,090,277 | 5/1963 | Schmitmann | 87/8 |
| 3,092,892 | 6/1963 | Ryan, Jr. et al. | 428/373 |
| 3,118,011 | 1/1964 | Breen | 264/168 |
| 3,145,133 | 8/1964 | Barton | 428/373 X |
| 3,321,448 | 5/1967 | Hebeler | 260/78 |
| 3,334,436 | 8/1967 | Cole, Jr. | 43/44.98 |
| 3,402,097 | 9/1968 | Knudsen et al. | 57/245 X |
| 3,451,305 | 6/1969 | Christensen et al. | 87/6 |
| 3,500,498 | 3/1970 | Fukuma et al. | 425/DIG. 217 |
| 3,509,013 | 4/1970 | Oppenlander | 428/373 |
| 3,562,093 | 2/1971 | Griffiths | 428/373 |
| 3,699,768 | 10/1972 | Roberts et al. | 57/210 X |
| 3,828,544 | 8/1974 | Alker | 57/210 |
| 3,968,725 | 7/1976 | Holzhauer | 87/6 |

Primary Examiner—John Petrakes
Attorney, Agent, or Firm—Stevens, Davis, Miller & Mosher

[57] ABSTRACT

A composite fishing line comprising a core and braided jacket the core being made of material which will break under a predetermined tensile loading of the line, said braided jacket being made of a different material which does not break under said predetermined tensile loading and having a braid tightness which permits reoccurrent breaks in the core under the reoccurrence of said tensile loading without affecting the utilization of the line.

8 Claims, 5 Drawing Figures

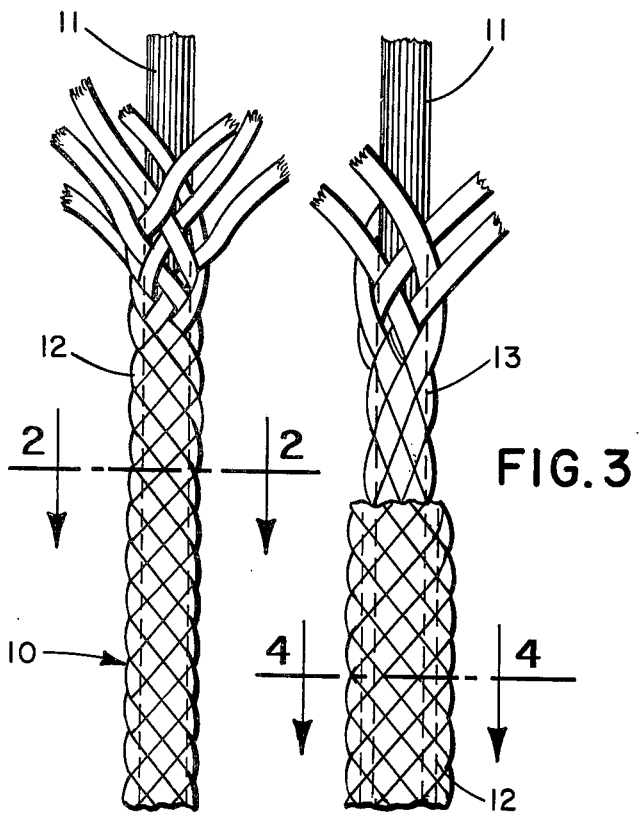
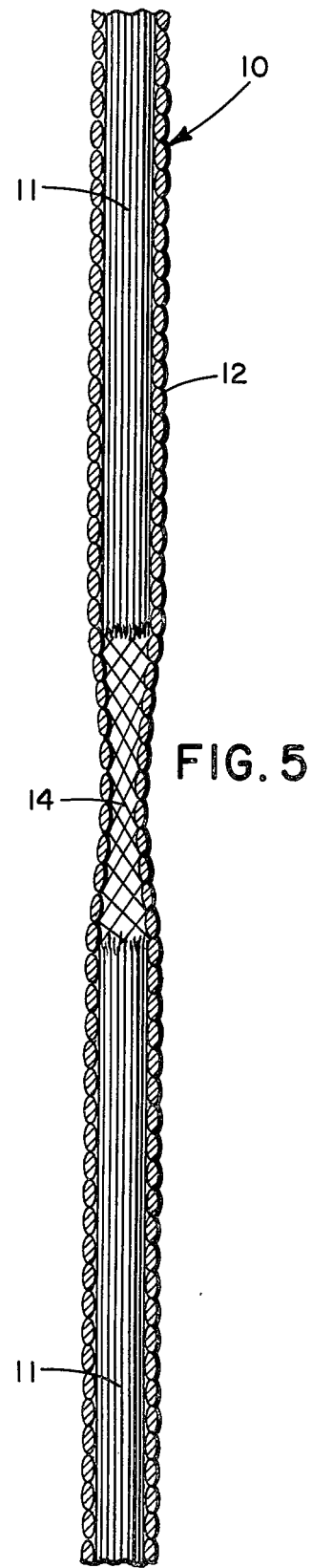
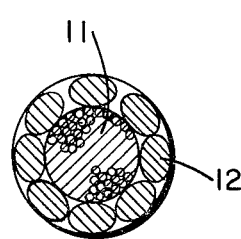
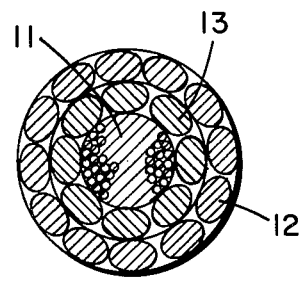

COMPOSITE LINE OF CORE AND JACKET

This invention relates to a composite line containing two different filamentary materials one of which will permit sequentially numerous breaks within its own length but which will not affect the utilization of the line because of the breaks. More particularly, the invention relates to a composite line containing a core of one material and a braided jacket of a different material.

BACKGROUND OF THE INVENTION

The ideal fishing line would have very low elongation up to very close to its ultimate breaking load and just prior to breaking be able to absorb a very large amount of energy.

The most commonly used fishing lines of today are of either the braided or monofilament type. Braided fishing lines have been known for a long time and have been used particularly in casting because of flexibility which makes it easier to cast with more accurate results. The braided line also has the advantage of low stretch or elongation which permits the fisherman to set the hook more readily. However, there also are disadvantages to using braided line in that the braided line has a relatively short life due to abrading by contact with the reel, rod and objects either above or in the water.

To overcome some of the disadvantages of the earlier developed braided fishing line the monofilament fishing line was developed which is smaller diametrically for the same # test. In addition it has a smoother surface and therefore is less likely to abrade.

The monofilament line, however, has the disadvantageous property of greater elongation which makes the line less sensitive. This makes it more difficult for the fisherman to sense a strike or to set the hook.

However, neither of the fishing lines can answer one of the problems which every fisherman has, i.e., to know when his line is about to break from too great a tensile loading. The currently used lines whether braided or monofilament do not in any way indicate to the fisherman that he has too great a tensile loading and is about to have his line break if some remedial action is not taken. This too high tensile loading may be the result of the fisherman having too big a fish on his line for the # test being used or the drag setting of the reel is too high.

SUMMARY OF THE INVENTION AND OBJECTS

Therefore it is an object of this invention to provide a line which notifies the user when he is reaching a dangerously high tensile loading with respect to the strength of the line being used.

Another object of this invention is to provide a fishing line of low elongation in the usable range of from 0-75% of the ultimate strength.

A further object of this invention is to provide a fishing line of long life.

An additional object of this invention is to provide a fishing line which permits easy setting of the hook in the fish.

These and other objects of this invention are achieved by a composite line containing two different filamentary materials one of which will break numerous times before the other. The line is in the form of a breakable core of one material and a braided jacket of another.

For the composite line to bring to the fisherman's attention through sound and feel the fact that too great a tensile loading exists, the following conditions are required:

(1) The jacket material must have more ultimate elongation than the core material;
(2) The jacket material must have a tensile which is greater than the tensile of the core material but not more than about 95% greater;
(3) The jacket construction must give a braid tightness which will permit the jacket to regrip the core once the core has broken so that the core may be broken again and again with the continued use of the line.

BRIEF DESCRIPTION OF THE DRAWINGS

Other details and features of the invention will stand out from the description given below by way of non-limitative example and with reference to the accompanying drawings, in which:

FIG. 1 illustrates one embodiment of the invention in which a braided jacket surrounds a breakable core;

FIG. 2 is a cross-section according to line 2—2 of FIG. 1;

FIG. 3 illustrates a second embodiment in which two braided jackets surround the breakable core;

FIG. 4 is a cross-section according to line 4—4 of FIG. 3; and

FIG. 5 illustrates a longitudinal section of FIG. 1 at a core break.

DETAILED DESCRIPTION OF PREFERRED EMBODIMENTS

Referring to FIGS. 1 and 2, 10 designates generally the braided line with core 11 and braided jacket 12. The core 11 is formed of strands of material, the material being a polyimide, fiberglass, stainless steel, graphite or polyamide. Preferably the core is made from a polyimide of an aromatic tetracarboxylic acid dianhydride sold under the trademark KEVLAR ® and more specifically defined in U.S. Pat. No. 3,179,634. However, any strand material may be used which has an elongation of from 0.8 to 23.5 percent and a tenacity of from 3.0 to 21.7 grams per denier. The jacket 12 is formed from synthetic fiber material such as a polyester, polyamide, polyurethane or polypropylene. The polyester formed from dimethyl terephthalate and ethylene glycol and sold under the trademark DACRON ® is preferred for the jacket. However, other synthetic fiber material may be employed providing it has an elongation of from 9 to 66 percent and a tenacity of from 2.5 to 8.5 grams per denier. The ratio of elongation of the jacket material to the core material varies between about (1.35/1) and (11/1) while the ratio of tensile of the core material to the tensile of the jacket is less than one and preferably varies from (0.514/1) to (0.996/1), most particularly, (0.75/1).

The tightness of the braid in relation to the core is dependent upon the core size and the manner in which the braiding machine is adjusted to produce a braid of from 10 to 75 picks per inch. The adjustments which may be made to a braiding machine in order to determine the tightness of the braid include varying the number of strand carriers, gears, gear ratios, grooves and collector ring height. By coordinating the foregoing a composite line is formed which will permit numerous breaks in the core of the line with continued use thereof.

The theory to explain the multiple break phenomena is exemplified by the old Chinese "finger trap." When enough tensile loading is exerted on the composite line the core will break first. The outer jacket then tightens up regripping the core so that the core may be broken again and again. Thus the size of the core in relation to the braided jacket becomes critical. A too loose jacket will not produce the desired result.

In FIGS. 3 and 4 is shown a heavier composite line braided e.g. on a 16 carrier braider. This produces a larger hole in the jacket and a more inflexible jacket. To assure a tight grip by the jacket 12 on the core 11 the core has had an intermediate jacket 13 applied thereto. Although the intermediate jacket is utilized in the development of heavy duty lines it may also be utilized for less heavy duty lines.

FIG. 5 shows the Chinese "finger trap" effect at the core break. The jacket at the point of core break necks down 14 and regrips the core so that when the tensile load again reaches the capacity of the tensile strength and elongation of the core further breaks may occur.

The following table demonstrates the number of breaks per 10 inches of line utilizing various core and sleeve materials when braided on machines, such as a New England Butt Braider, carrying a varying number of carriers and producing varying picks per inch.

TABLE

COMPOSITE BRAIDED LINE

| Number | Size | Carriers | Jacket | Jacket Material Percent Elong. | Tenacity grams/ Denier | Core | Percent Elong. | Tenacity grams/ Denier | Breaks Per 10 inch Length | Picks/ Inch |
|---|---|---|---|---|---|---|---|---|---|---|
| 1 | 18# | 8(16) | 4 × 150 denier DACRON® 4 × 220 denier DACRON® double alternating (polyester) pattern | 9-11 | 6-7 | 200 denier KEVLAR® 29 (polyimide) | 4 | 21.5 | 3.6 | 36 |
| 2 | 27# | 12 | 8 × 220 denier DACRON® 4 × 150 denier DACRON® 2-1-2-double alternating pattern | 9-11 | 6-7 | 2 × 200 denier K.29 | 4 | 21.5 | 4.5 | 48 |
| 3 | 35# | 12 | 10 × 220 denier DACRON® 2 × 150 denier DACRON® 5-1 double alternating pattern | 9-11 | 6-7 | 2 × 200 denier K.29 | 4 | 21.5 | 4.09 | 40 |
| 4 | 45# | 12 | 12 × 220 denier DACRON® | 9-11 | 6-7 | 400 denier K.29 | 4 | 21.5 | 5.36 | 39 |
| 5 | 72# | 12 | 12 × 440 denier DACRON® | 9-11 | 6-7 | 1000 denier K.29 | 4 | 21.5 | 5.91 | 36 |
| 6 | 18# | 12 | 10 × 220 denier DACRON® 2 × 150 denier DACRON® 5-1 double alternating pattern | 9-11 | 6-7 | 900 denier Fiberglass | 3 | 6.6 | 5.0 | 36 |
| 7 | 27# | 12 | 10 × 220 denier DACRON® 2 × 150 denier DACRON® 5-1 double alternating pattern | 9-11 | 6-7 | 304 BRUNSMET Stainless Steel 8/1159 AD131 | 8 | 3.0 | 15.8 | 36 |
| 8 | 18# | 12 | 8 × 220 denier DACRON® 4 × 150 denier DACRON® 2-1-2-1 double alternating pattern | 9-11 | 6-7 | 304 BRUNSMET S.S. | 8 | 3.0 | 10.1 | 72 |
| 9 | 20# | 12 | 8 × 220 denier DACRON® 4 × 150 denier DACRON® 2-1-2-1 double alternating pattern | 9-11 | 6-7 | THORNEL 300 Graphite | 1-2 | 7.8-14.1 | 6.3 | 72 |
| 10 | 12# | 12 | 12 × 70 denier Nylon 66 polyamide | 18-28 | 5.9-8.8 | 200 denier K.29 | 4 | 21.5 | 2.4 | 48 |
| 11 | 18# | 12 | 12 × 100 denier Nylon 66 | 18-28 | 5.9-8.86 | 200 denier K.29 | 4.0 | 21.5 | 3.5 | 36 |
| 12 | 30# | 12 | .12 × 0.014 Polyurethane Mono | 60-70 | 2.5 | 17# TRILENE® XL OB nylon | 18-24 | 8.3 | 4.0 | 21 |
| 13 | 18# | 12 | 6 × 0.0032 TRILENE® XL Mono) 6 × 0.0065 TRILENE® XL Mono) double alternat. (nylon) pattern | 18-24 | 8.3 | 200 denier K.29 | 4.0 | 21.5 | 10.25 | 32 |
| 14 | 18# | 12 | 2 × 220 denier DACRON® 10 × 150 denier DACRON® 2-1-2-1 in one direction only | 9-11 | 6-7 | 200 denier K.29 | 4.0 | 21.5 | 3.3 | 60 |
| 15 | 20# | 12 | 12 × 210 denier Polypropylene | 12-25 | 5.5-7 | 200 denier K.29 | 4.0 | 21.5 | 2.7 | 35 |
| 16 | 20# | 12 | 12 × 210 denier Polypropylene | 12-25 | 5.5-7 | 200 denier K.29 | 4.0 | 21.5 | 3.3 | 46 |

TABLE-continued

COMPOSITE BRAIDED LINE

| Number | Size | Carriers | Jacket | Jacket Material Percent Elong. | Tenacity grams/Denier | Core | Percent Elong. | Tenacity grams/Denier | Breaks Per 10 inch Length | Picks/Inch |
|---|---|---|---|---|---|---|---|---|---|---|
| 17 | 120# | 16 | 16 × 440 denier DACRON® | 9-11 | 6-7 | 1000 denier K.29 | 4.0 | 21.5 | 3.0 | 24 |
| 18 | 120# | 16 | 16 × 440 denier DACRON® | 9-11 | 6-7 | 200 denier K.29 | 4.0 | 21.5 | — | 24 |
| — | core | 12(6) | 6 × 220 denier DACRON® each direction | 9-11 | 6-7 | Braid defined below 1 × 1500 denier K.29 | 4.0 | 21.5 | 3.6 | 16 |

Thus if the foregoing parameters are followed a composite line is produced whereby the fisherman can feel as well as hear when the breaks occur in the core so that he is warned that his line is being subjected to dangerously high tensile loading. The knowledgeable fisherman thus can back off his drag when he senses these breaks occurring and yet not lose his fish.

What is claimed is:

1. A composite line containing two different filamentary materials in the form of a core and jacket of different tensile strengths and elongations, said core sequentially breaking at least twice under a predetermined tensile loading of the line without breaking the jacket thereby signalling the user that too great a tensile loading exists and the jacket gripping the core at the breaks without affecting the further utilization of the line.

2. A composite fishing line comprising a core and braided jacket the core being made of material which will break under a predetermined tensile loading of the line to signal the user that too great a tensile loading exists, said braided jacket being made of a different material which does not break under said predetermined tensile loading and having a braid tightness which grips the core at the break and permits reoccurrent breaks in the core under the reoccurrence of said tensile loading without affecting the utilization of the line.

3. A composite fishing line comprising a core material to signal the user when too great a tensile loading exists and a braided jacket, said braided jacket being made of a material having an ultimate elongation greater than the elongation of the material of which the core is made, said braided jacket having a tensile strength greater than the tensile strength of the core material and a braid tightness which grips the core at a break produced under a predetermined tensile loading so that upon the reoccurrence of said predetermined tensile loading the core material can break again and again.

4. The composite fishing line of claim 3, wherein the core has an elongation of from 0.8 to 23.5 percent, the jacket has an elongation of from 9 to 66 percent, the ratio of elongation of the jacket to the core is from about 1.35 to 11, the tenacity of the core is from 3 to 21.5 grams per denier, the tenacity of the jacket is from 2.5 to 8.5 grams per denier, the ratio of tensile of the core to the tensile of the jacket is from (0.514/1) to (0.996/1) and the braid of said jacket has from 10 to 75 picks per inch.

5. The composite line of one of claims 1-4, wherein said material breakable under a predetermined tensile loading is a polyimide of a tetracarboxylic acid dianhydride and the unbreakable material is a polyester.

6. A composite fishing line comprising a core, a braided outside jacket and a braided intermediate jacket, the core being made of material which will break under a predetermined tensile loading of the line to signal the user that too great a tensile loading exists, said braided jackets being made of a different material from said core which do not break under said predetermined tensile loading and said outside jacket has a braid tightness which grips the core and intermediate jacket and permits reoccurrent breaks in the core material under the reoccurrence of said tensile loading without affecting the utilization of the line.

7. The composite fishing line of claim 6, wherein the core has an elongation of from 4 to 6 percent at first break, the jackets have an elongation of from 16 to 22 percent at ultimate break, the ratio of elongation of the jacket to the core is from 2.67 to 4.90, the tenacity of the core is from 21.5 to 21.7 grams per denier, the tenacity of the jacket is from 6 to 7 grams per denier, the ratio of tensile of the core to the tensile of the jacket is from 0.8 to 0.9 and the braid of said jackets have from 16 to 24 picks per inch.

8. The composite line of one of claims 6 and 7, wherein said material breakable under a predetermined tensile loading is a polyimide of a tetracarboxylic acid dianhydride and the unbreakable material is a polyester.

* * * * *